(12) United States Patent
Liekens

(10) Patent No.: US 10,876,669 B2
(45) Date of Patent: Dec. 29, 2020

(54) CLOSING-OFF PLUG FOR PIPE ENDS STOPPING HIGH PRESSURE SHOCKS

(71) Applicant: Henri Liekens, Oisterwijk (NL)

(72) Inventor: Henri Liekens, Oisterwijk (NL)

( * ) Notice: Subject to any disclaimer, the term of this patent is extended or adjusted under 35 U.S.C. 154(b) by 65 days.

(21) Appl. No.: 16/150,582

(22) Filed: Oct. 3, 2018

(65) Prior Publication Data

US 2019/0331279 A1 Oct. 31, 2019

(30) Foreign Application Priority Data

Apr. 25, 2018 (NL) ...................................... 1042843

(51) Int. Cl.
*F16L 11/08* (2006.01)
*F16L 55/11* (2006.01)

(52) U.S. Cl.
CPC ................................ *F16L 55/1108* (2013.01)

(58) Field of Classification Search
CPC ....... B25B 27/0028; F16L 55/16; F16B 21/10
USPC ........................................................... 138/89
See application file for complete search history.

(56) References Cited

U.S. PATENT DOCUMENTS

| | | | | | |
|---|---|---|---|---|---|
| 3,156,373 | A | * | 11/1964 | Willis | F16L 55/136 220/237 |
| 3,421,404 | A | * | 1/1969 | Jacobs | F16B 13/066 411/55 |
| 3,941,028 | A | * | 3/1976 | Lobello | E21D 21/008 411/55 |
| 4,421,137 | A | * | 12/1983 | Nusbaumer | F16L 55/13 138/89 |
| 4,982,763 | A | * | 1/1991 | Klahn | F28F 11/02 138/89 |
| 5,423,351 | A | * | 6/1995 | Keating | F16L 55/11 138/89 |
| 10,040,182 | B2 | * | 8/2018 | Kirilichin | F16L 55/1108 |
| 2015/0202754 | A1 | * | 7/2015 | Kirilichin | B25B 27/0014 29/523 |

* cited by examiner

*Primary Examiner* — Patrick F Brinson
(74) *Attorney, Agent, or Firm* — R. Neil Sudol; Henry D. Coleman

(57) ABSTRACT

Closing-off plug for pipe ends, which pipes are filled with highly pressurized liquid or gas. The closing-off plug comprises a cylindrical closing cap (1) with a tapering thin ring-shaped wall end (2), a cylindrical block (3) with a conical rim (4) and a bolt with bolt head (8) and threaded stem (5) of high quality steel. The cylindrical block (3) is retracted in the ring-shaped wall end (2). Sharp ring-shaped ribs (6) are pressed into the inner wall of the pipe.

13 Claims, 2 Drawing Sheets

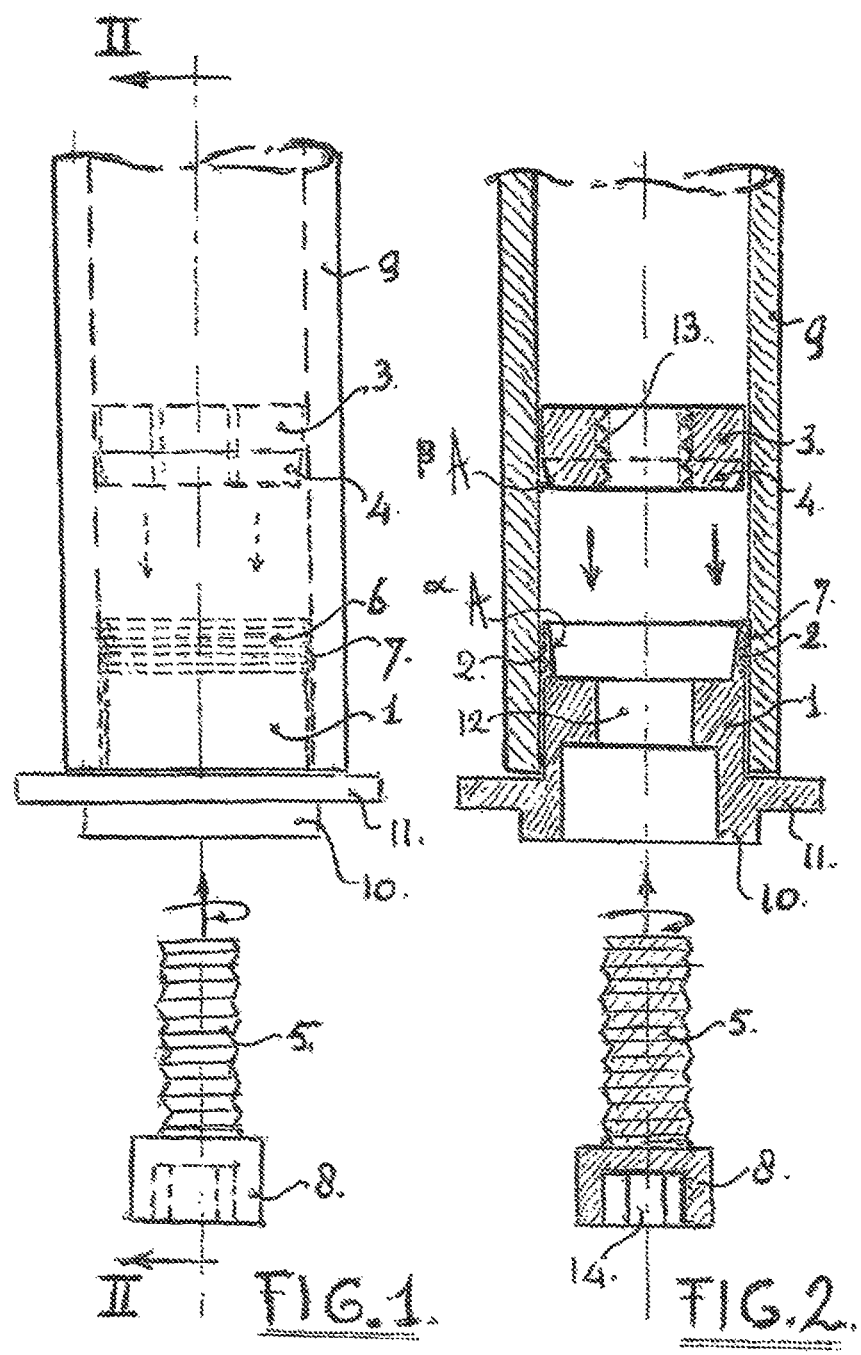

CLOSING-OFF PLUG FOR PIPE ENDS STOPPING HIGH PRESSURE SHOCKS

FIELD OF THE INVENTION

The present invention concerns a closing-off plug for metal and/or steel pipe ends, which are charged with suddenly very high pressurized liquids or gasses, which closing plug consists of a first walled cylindrical block with on the outside a set ring shaped ribs, which are pressed against the inner wall of the pipe end with a retractable second cylindrical block, wherein the pressure against the inner wall of the pipe end is obtained by a tapered structure activated by a threaded internal bolt.

BACKGROUND OF THE INVENTION

The state of the art includes end closing structures for pipes filled with liquids under relatively high pressure. The European Patent Application EP 0 392 646 A2 describes a retainer plug for relatively high pressures on the steel tube ends. This construction consists of a tube plug (16) with relatively is thick walls, which plug has to be fitted very precisely in the pipe end in the first place. There are rectangular ribs (32) on the outside, which have only to be pressed against the inner wall of the pipe (34). Only friction has to stop blowing the retained plug out of the pipe end. So the internal pressure of the pipe needs to be relatively low. Furthermore, there is a second cylindrical internally tapered block named mandrel (28), which can only bring mentioned ribs (32) of the closed end (24) with relative low pressure against the internal wall (34) of the pipe. The retraction bolt structure of a normal steel quality cannot give enough retraction forces to mentioned mandrel (28). So you can conclude that this retainer plug is not usable for very high pressure shocks in the pipe. The ribs (32) are not pressed into the inner wall of the tube.

From the above you can conclude there is a serious drawback for using this retainer plug for very high internal pressure in pipes.

Another state of the art is the US Patent Application Publication US 201510202754A1, titled: "System and Method for Installing a Manifold Plug". This Patent Application also described a sealing assembly for the end of a pipe or tube and not a closing plug for very high pressures. With a mechanical rotation drive apparatus a conical threaded core is driven in a cylindrical metallic sleeve, which expands radially outwards to press protrusions against the inner wall of the pipe. Mentioned mechanical rotation drive apparatus with a threaded pull rod of normal steel is very restricted because of his torque to cause big radial expansions of the metallic sleeve.

So due to its construction this patent application has drawbacks for causing big expansion forces for pressing a set of sharp rings into the inner wall of a steel pipe.

OBJECTS OF THE INVENTION

Therefore, the aim of our invention is to overcome the mentioned drawbacks and to provide closing off plug or pipe ends for very high internal pressures of liquids and gasses, which do not have these drawbacks and are very quick and easy to install. So the connection between a closing off plug and inner wall of the tube has to be very strong in order to withstand high pressure shocks in the pipe. Furthermore, with our invention the labour costs at the construction site are low and the manufacturing costs in large numbers are also relatively low.

So the closing off plug according to our invention is a very much improved closing off assembly, as appeared during testing in heavy duty circumstances.

SUMMARY OF THE INVENTION

The closing-off plug according to the invention is characterized in that said first cylindrical block is executed as a cylindrical cap provided with a smooth bore and an internal tapering thin ring-shaped wall end, wherein the second cylindrical block provided with a central threaded bore and a conical rim is to be drawn by a bolt structure of a very high steel quality threaded stem by tightening the bolt head with a prestress spanner for penetrating or pressing the set ring shaped sharp ribs in said ring-shaped wall end of the inner wall of the pipe.

The advantage is a closing-off plug which penetrates with his sharp ribs into the inner side of the pipes and so easily mechanically forms a very strong closing-off cap to the pipe.

Furthermore the closing-off plug according to the invention is characterized in that said cylindrical sealing cap at the outside of the steel pipe or tube is provided with a flange with thereon a square top-piece for holding a spanner and that said bolt head with its threaded stem through a bore in the threaded bore of the cylindrical block is fastened with a torque spanner.

In practice this appeared to be the most labour-friendly and efficient way to install the sealing assembly in pipe ends.

So the closing-off plug according to the invention is further improved and modified characterized in that said conical thin ring-shaped end with inwards directed conical rim has a tapering wall thickness of about 0.5 mm till 1 mm, where the created conical angle alpha α varies from 1 degree to approximately 5 degrees, preferably around 3 degrees, in which said cylindrical block with its conical rim a conical angle beta β displays between 2 and 8 degrees, preferably 6 degrees.

The advantages are that the tube wall is relatively easy to penetrate with the ribs by deforming the tapering thin ring-shaped assembly. The mentioned angles α and β are taken by a very critical choice.

BRIEF DESCRIPTION OF THE DRAWINGS

The embodiment of the present invention will now be described by way of example, with reference to the accompanying drawing with figures in which:

FIG. 1 is a side view of a pipe with the closing-off plug in exploded view according to the invention;

FIG. 2 is a longitudinal section of the pipe with closing-off plug according to FIG. 1 over the line 11-11 and FIG. 3 is a section of FIG. 2 but now the closing-off plug is mounted completely in the pipe end.

DETAILED DESCRIPTION

Figure 3:
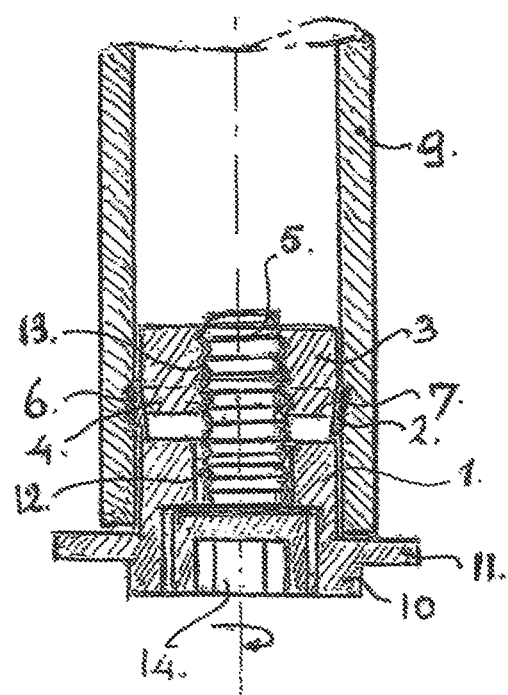

In FIG. 1 is reproduced in exploded view and in side view the complete closing-off plug containing a closing-off plug 1 with at the end an internal tapering thin ring-shaped wall end 2, a cylindrical block 3 with a conical rim 4 and a prestress bolt of high quality with a bolt head 8 and a threaded stem 5. This threaded stem 5 has to be threaded in the threaded bore 13 of the cylindrical block 3. Because of the pressure, these closing-off plugs are mostly placed in a thick-walled pipe 9. Pipe 9 is typically made of a metal such as steel but pipe 9 may be made of other materials such as aluminum, copper, or plastics.

In FIG. 2 a longitudinal section is shown over the line 11-11 of FIG. 1. The cross-section of the cylindrical closing-off plug 1 is designed very carefully and recognizable is the tapering thin ring-shaped wall end 2 with a set of ring-shaped sharp ribs 6. All the parts of the closing-off plug are indicated in the same way in all FIGS. 1, 2 and 3.

The set of ring-shaped sharp ribs 6 to penetrate the inner wall of the pipe end 9 has a profile depth or radial dimension of approximately 0.6 mm. The closing-off plug is made of special chrome steel 1722542CrMo4V.

FIG. 3 shows how the closing-off plug is mounted in order to get an excellent closing-off structure as shown in FIG. 3. A spanner or wrench is needed to engage the top piece 10 in order to hold the cylindrical closing-off plug 1. The bolt head 8 has a central polygonal opening 14 configured to receive a torque spanner or wrench. The flange 11 is needed to close the end of pipe 9. With a study of FIGS. 2 and 3, the bores 12,13 become clear. The ridges or ribs 6 are mounted to penetrate the inner wall 7 of pipe 9. So the closing-off plug cannot be blown out by the very high pressure shocks in the thick-walled pipe 9.

However, it is obvious that modifications and/or additions to the afore-mentioned closing-off plug can be made but these shall remain within the field and scope of the invention.

The invention claimed is:

1. A closing-off plug for pipe ends, which are charged with suddenly very high pressurized liquids or gasses, which closing-off plug comprises a walled first cylindrical block with, on an outside, a set of ring shaped ribs, which are pressed against an inner wall of a pipe end and a retractable second cylindrical block, wherein said first cylindrical block is a cylindrical cap provided with a smooth bore and an internal tapering thin ring-shaped wall end, wherein the second cylindrical block is provided with a central threaded bore and a conical rim and is to be drawn into said tapering ring-shaped wall end by a bolt structure of a very high steel quality with a threaded stem by tightening a bolt head with a prestressed spanner for penetrating or pressing the set of ring-shaped sharp ribs of said tapering, ring-shaped wall end against the inner wall of the pipe end, said closing-off plug being provided with a flange with a top-piece thereon, said top-piece being configured to receive or operatively engage with a spanner or wrench, said bolt with the threaded stem extending through the smooth bore in the second cylindrical block being configured to receive or operatively engage with a torque spanner or wrench.

2. Closing-off plug as defined in claim 1, wherein said thin ring-shaped wall end with conical rim has a tapering wall thickness of approximately 0.5 mm to approximately 1 mm, wherein a thus created conical angle alpha varies from 1 degree to approximately 5 degrees.

3. Closing-off plug as defined in claim 1, wherein said second cylindrical block with the conical rim has a conical angle beta between 2 and 8 degrees.

4. Closing-off plug as defined in claim 1, wherein said set of ring-shaped sharp ribs to penetrate the inner wall of the pipe end has a profile depth or radial dimension of approximately 0.6 mm.

5. Closing-off plug as defined in claim 1, wherein the bolt head has a central polygonal opening configured to receive said torque spanner or wrench.

6. Closing-off plug as defined in claim 1, wherein the closing-off plug is made of special chrome steel 1722542CrMo4V.

7. Closing-off plug as defined in claim 1, wherein said pipe end is made of a material taken from the group consisting of steel, aluminum, copper, and plastics.

8. A closure plug assembly for pipe ends, comprising:

a first cylindrical block or body provided on an external cylindrical surface with a set of sharp annular ribs, said sharp annular ribs being disposable in a pressure fit against an inner wall of a pipe end, said first cylindrical block or body being provided at one end with an external or outwardly projecting flange and with a top-piece, said top-piece being configured to receive or operatively engage with a spanner or wrench, said first cylindrical block or body being provided at an end opposite said flange with a tapered recess or bore;

a second cylindrical block or body insertable in said tapered recess or bore in said first cylindrical block or body, said second cylindrical block or body having a tapered outer surface, said second cylindrical block or body having a threaded internal surface; and a bolt having a head and an externally threaded stem, said stem being operatively engageable with said threaded internal surface to pull said second cylindrical block or body into said tapered recess or bore and thereby press said sharp annular ribs in said pressure fit against said inner wall of said pipe end, said bolt being configured to receive or operatively engage with a torque spanner or wrench.

9. The closure plug assembly as defined in claim 8, wherein said first cylindrical block or body is provided at said end opposite said flange with a thin annular or ring-shaped wall end with a tapering wall thickness of approximately 0.5 mm to approximately 1 mm and concomitantly a conical angle varying between approximately 1 degree and approximately 5 degrees.

10. The closure plug assembly as defined in claim 8, wherein said second cylindrical block has a conical rim with a conical angle between 2 and 8 degrees.

11. The closure plug assembly as defined in claim 8, wherein said set of sharp annular ribs have a profile depth or radial dimension of approximately 0.6 mm.

12. The closure plug assembly as defined in claim 8, wherein said head of said bolt has a central polygonal opening configured to receive or operatively engage with said torque spanner or wrench.

13. The closure plug assembly as defined in claim 8, wherein at least said second cylindrical block or body is made of chrome steel 1722542CrMo4V.

\* \* \* \* \*